United States Patent
Miyadera

(10) Patent No.: US 6,324,346 B1
(45) Date of Patent: Nov. 27, 2001

(54) DATA ERASURE CONTROL SYSTEM FOR CAMERA

(75) Inventor: Shunichi Miyadera, Tokyo (JP)

(73) Assignee: Asahi Kogaku Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/313,761

(22) Filed: May 18, 1999

(30) Foreign Application Priority Data

May 19, 1998 (JP) .................................. 10-136507
Jun. 9, 1998 (JP) .................................. 10-160314

(51) Int. Cl.$^7$ .......................... G03B 17/48; G03B 19/00; H04N 7/18
(52) U.S. Cl. .......................... 396/429; 396/287; 396/374
(58) Field of Search .................... 396/374, 429, 396/287; 358/906, 909.1; 348/64

(56) References Cited

U.S. PATENT DOCUMENTS

| | | |
|---|---|---|
| 5,212,556 | 5/1993 | Ogawa . |
| 5,497,238 | 3/1996 | Sato et al. . |
| 5,950,031 | * 9/1999 | Yamagata .............................. 396/429 |
| 5,978,016 | * 11/1999 | Lourette et al. ........................ 348/64 |
| 6,085,047 | * 7/2000 | Taka .................................... 396/374 |
| 6,085,048 | * 7/2000 | Mikoshiba et al. .................. 396/374 |

* cited by examiner

Primary Examiner—Alan A. Mathews
(74) Attorney, Agent, or Firm—Greenblum & Benstein, P.L.C.

(57) ABSTRACT

A data erasure control system for a camera that is capable of forming images on a photographing film, and of capturing and storing image data including a plurality of frames in a memory is provided with: a judging system that judges whether a photographing operation with respect a photographing film has been completed; and a data erasure prohibiting system that prohibits the image data stored in the memory from being erased until the judging system judges that a photographing operation with respect a photographing film has been completed.

17 Claims, 13 Drawing Sheets

DATA ERASURE CONTROL SYSTEM FOR CAMERA

BACKGROUND OF THE INVENTION

The present invention relates to a data erasure control system for a camera which is capable of forming images on a photographing film, and of capturing electronic image and storing the image data in a memory.

Conventionally, cameras capable of forming an image of an object on a photographing film, and of capturing an electronic image of an object and storing image data in a memory have been known. In such cameras, the image data stored in the memory are used to confirm the photographed pictures before the film is developed. Accordingly, such cameras are generally provided with display devices, and by displaying the images corresponding to the image data stored in the memory on the display device, the photographed pictures are confirmed.

The capacity of the memory, however, is limited. Thus, the conventional camera having the memory is constituted such that image data can be erased.

FIGS. 11 and 12 show a relationship between images on the photographing film and frames of the image data in the memory in the conventional system.

As shown in FIG. 11, images I1, I2, I3 ... are successively formed on the film, and simultaneously with image formation on the photographing film, frames D1, D2, D3 ... of image data corresponding to the images I1, I2, I3 ... are stored in the memory. As long as photographing is successively performed, images are successively formed on the film and the frames of the image data are successively stored in the memory. Accordingly, the number and order of the images on the film completely correspond to the number and order of the frames of the image data in the memory.

However, when a frame of the image data, for example, frame D3, in the memory is erased, as shown in FIG. 12, the number and order of the images on the film and the frames of the image data stored in the memory do not coincide.

When such a disagreement exists, i. e., if some of the frames of the image data have been deleted, it becomes very difficult for the operator to confirm whether certain images have been formed on the photographing film by displaying the frames of the image data stored in the memory. That is, the operator may not confirm that certain pictures were photographed.

FIGS. 13 and 14 show another example of the conventional system.

As shown in the FIG. 13, when images I1, I2, I3 are formed, frames D1, D2, and D3 of the image data are stored in the memory. At this stage, in the conventional system, if the film, on which the images I1–I3 are formed, is removed from the camera and a new film is loaded, previously stored image data (i.e., frames D1, D2, D3) remain undeleted. If new images I101, I102, I103 ... are formed on the new film, corresponding frames of image data (i.e., frames D101, D102, D103) will be stored in the memory, as shown in FIG. 14. Thus, the newly stored frames D101, D102, D103 follow the previously stored frames D1, D2, and D3. Accordingly, the number and order of the images formed on the new film do not coincide with the number and order of the frames of the image data stored in the memory.

Therefore, also in this case, it is difficult to confirm whether certain images have been formed on the photographing film by monitoring displayed images of the frames of the image data stored in the memory.

SUMMARY OF THE INVENTION

It is therefore an object of the present invention to provide an improved data erasure control system for a camera in which images are formed on the film and corresponding frames of the image data are stored in the memory, the number and order of the images on the film always correspond to the number and order of the frames of the image data in the memory.

For the above object, according to the present invention, there is provided a data erasure control system for a camera that is capable of forming images on a photographing film, and of capturing and storing image data including a plurality of frames in a memory. The data erasure control system includes: a judging system that judges whether a photographing operation with respect a photographing film has been completed; and a data erasure prohibiting system that prohibits the image data stored in the memory from being erased until the judging system judges that a photographing operation with respect a photographing film has been completed.

Since the image data is prevented from being erased, correspondence between the frames of the image data and the images formed on the photographing film will not change until the image formation on the photographing film is completed.

Optionally, the judging system may determine that the photographing operation has been completed when the film has been completely rewound.

In particular, the judging system may have a perforation counting system that counts the number of perforations formed on the photographing film and passed through the perforation counting system, and whether the film has been rewound is determined in accordance with the number of perforations counted by the perforation counting system.

Alternatively, the judging system may determine that the photographing operation has been completed when the film has been completely rewound and a back cover of the camera is opened.

In this case, the judging system may further include a switch that is turned ON or OFF when the back cover is closed or opened.

Optionally, the data erasure prohibiting system allows erasure of the image data on frame basis when the judging system judges that the photographing operation has been completed.

Optionally or alternatively, the data erasure prohibiting system may erase all the frames of the image data when the judging system judges that the photographing operation has been completed.

In this case, the judging system may determine that the photographing operation has been completed when films are exchanged.

In particular, the judging system may determine that the photographing operation has been completed when a back cover of the camera is once opened and then closed.

Preferably, the judging system may determine that the photographing operation has been completed when a new film is loaded in the camera.

DESCRIPTION OF THE PREFERRED EMBODIMENTS

The embodiments of the present invention will be described hereinafter with reference to the accompanying drawings.

Figure 1:
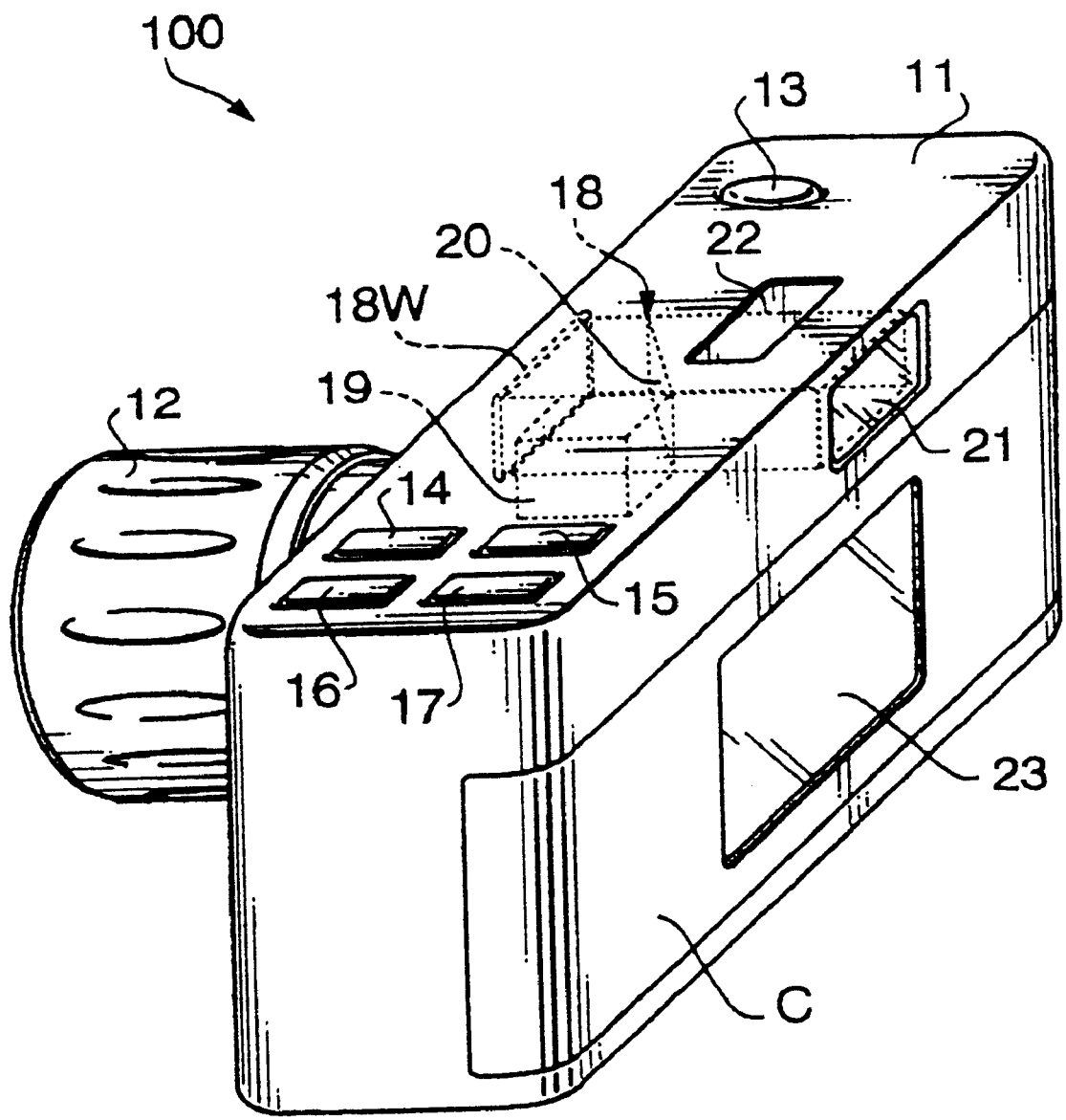
FIG. 1 is a schematic perspective view of a camera according to an embodiment of the invention.

FIG. 1 is a schematic perspective view of a camera 100 to which a data deletion control system according to the present invention is applicable.

The camera 100 is capable of forming images on a photographing film, and is also capable of capturing electronic images and storing image data in a memory provided therein.

As shown in FIG. 1, the camera 100 is provided with a body 11, a photographing optical system 12, a release button 13, an up-button 14, a down-button 15, a mode button 16, an erase button 17, and a display device 22. On the rear surface of the camera body 11, a back cover C is provided, and an LCD (Liquid Crystal Display) 23 is provided on the back cover C. The back cover C is a part of the body 11 formed as a cover of an opening through which film cartridges are exchanged. The LCD 23 displays an image corresponding to image data stored in a memory.

Figure 15:
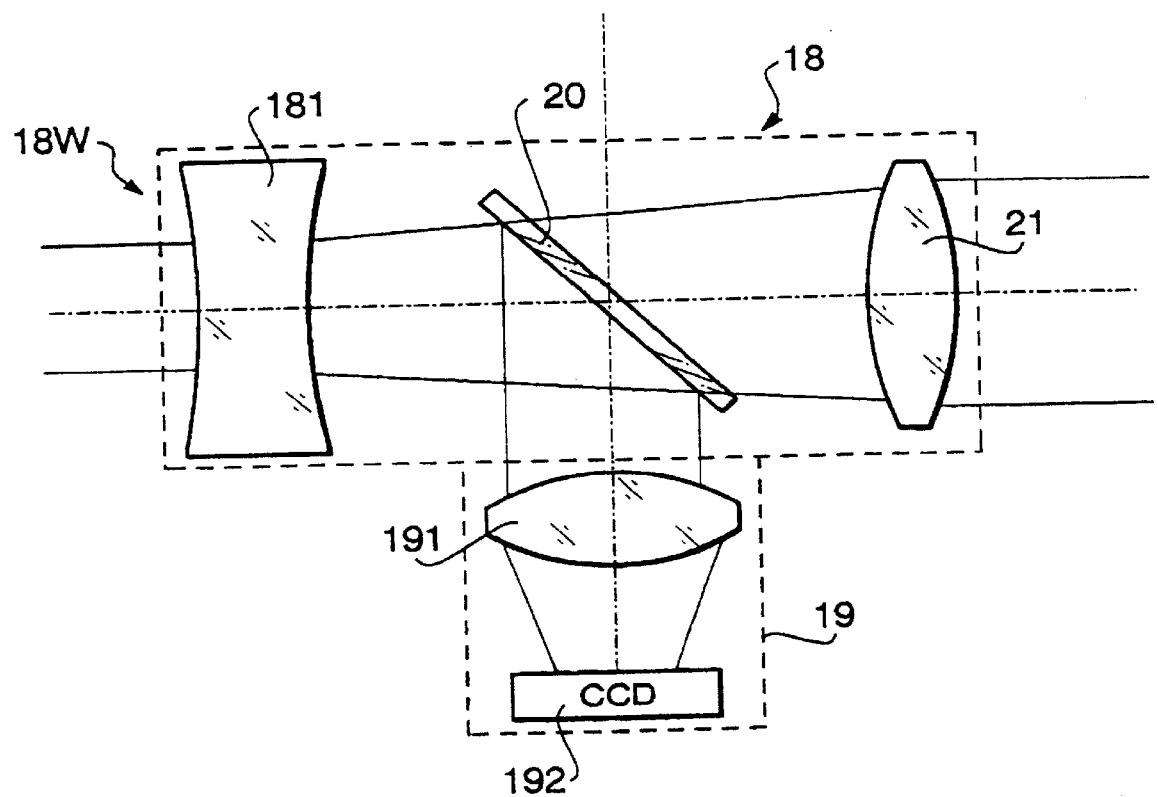
FIG. 15 schematically shows a constitution of the finder system.

The camera 100 also has a finder system 18, an exemplary constitution of which is schematically shown in FIG. 15. The finder system 18 includes an objective lens 181, a half mirror 20, an eyepiece 21, and an imaging device 19 which includes a charge-coupled device (CCD) 192 and an imaging lens 191. Light from an object enters the finder 18 through a finder window 18W, passes through the objective lens 181, is incident on the half mirror 20, and is split into two components:

one is reflected by the half mirror 20 and is incident on the imaging device 19, i.e., is incident on the imaging lens 191, which forms an image of an object on the CCD 192; and the other passes through the half mirror 20 and is incident on the eyepiece 21, through which an operator is capable of observing the object.

It should be noted that the LCD 23 is capable of displaying an image corresponding to the image currently formed on the CCD 192.

Figure 2:
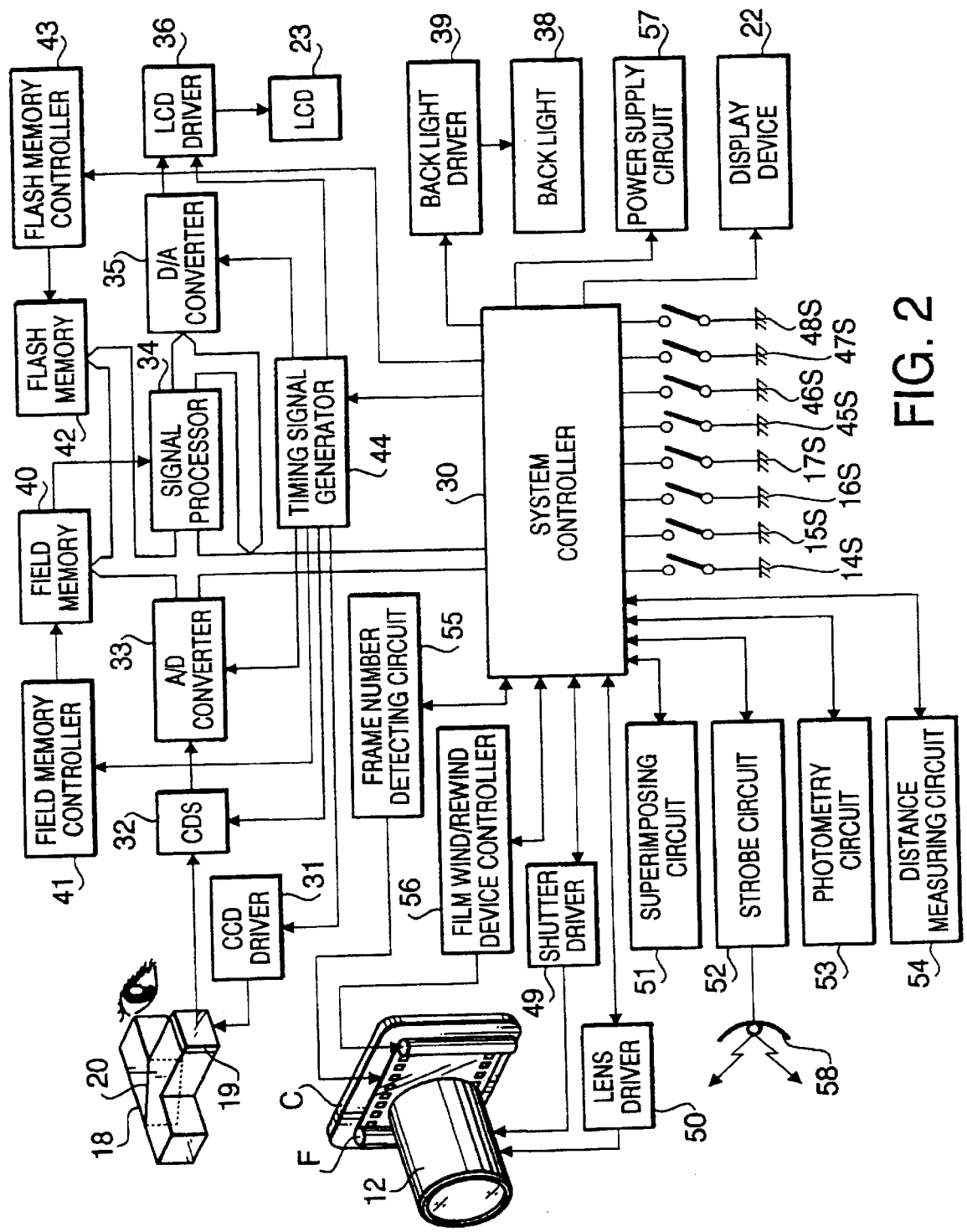
FIG. 2 is a block diagram showing the electronic constitution of the camera shown in FIG. 1.

FIG. 2 is a block diagram showing a control system of the camera 100.

The control system includes a system controller 30, which controls an overall operation of the camera 100.

The imaging device 19 outputs a color image signal corresponding to the image formed thereon. The imaging device 19 transmits the color image signal under the control of a CCD driver 31. A CDS (correlated dual sampling circuit) 32 removes a resetting noise from the color image signal, and transmits the color image signal to an A/D (analog-to-digital) converter 33, which converts the color image signal to the digital signal.

When the release button 13 is not being depressed, the digital signal generated by the A/D converter 33 is transmitted to a signal processor 34. The signal processor 34 processes the digital signal, and generates a luminance signal and color-difference signals. The signals processed by the signal processor 34 are transmitted to a D/A (digital-to-analog) converter 35.

Then, the analog image signals are transmitted to the LCD 23 through an LCD driver 36. The LCD 23 thus displays an image of the object in accordance with the transmitted image signals. On the rear side of the LCD 23, a back light 38 is provided to illuminate the LCD 23 under control of a back light driver 39.

When the release button 13 is fully depressed, a shutter driver 49 is controlled to open the shutter provided in the photographing optical system 12 so that the photographing film F is exposed to light passed through the photographing optical system 12.

The light passed through the photographing optical system 12 forms an image of an object on the photographing film F. When the photographing film F is sufficiently exposed to light, the system controller 30 controls the shutter driver 49 to close the shutter.

Simultaneously with the photographing operation described above, when the release button 13 is fully depressed, data representing a field of image outputted by the A/D converter 33 is temporarily stored in a field memory 40. The image data stored in the field memory 40 is then transmitted to the signal processor 34 where the image data is converted to a luminance signal data and color-difference signal data. The data generated by the signal processor 34 are transmitted to the system controller 30. The system controller 30 compresses the data (reduces data size), and transmits the compressed data to a flash memory 42. The image data is then stored in the flash memory 42.

A field memory controller 41 controls the read/write operations of the field memory 40, and a flash memory controller 43 controls the read/write operations of the flash memory 42.

To display an image corresponding to a frame of the image data stored in the flash memory 42, a frame data included in the image data is read out of the flash memory 42, and expanded into its original size by the system controller 30. The expanded frame data is temporarily stored in the field memory 40 during the expansion process. After the expansion is finished, the expanded digital image data is transferred from the field memory 40 to a D/A converter 35 and is converted into analog image signals (i.e., the luminance and color difference signals). The LCD driver 36 receives the analog image signals from the D/A converter 35, processes them, and transmits them to the LCD 23.

The LCD 23 thus displays a static image corresponding to a frame of the image data stored in the flash memory 42.

A timing signal generator 44 generates synchronizing signals under control of the system controller 30. With the synchronizing signals, the timing signal generator 44 synchronizes operations of the CCD driver 31, the CDS 32, the A/D converter 33, the signal processor 34, the D/A converter 35, the LCD driver 36, and the field memory controller 41.

The system controller 30 is connected with an up-switch 14S, a down-switch 15S, a mode switch 16S which are turned ON or OFF in accordance with operated status of the up-button 14, the down-button 15, and the mode button 16S. The system controller 30 is also connected with, an erase switch 17S, a release button full-depression switch 45S, a release button half-depression switch 46S, a power switch 47S, and a back cover switch 48S.

The erase switch 17S alternates its ON/OFF status upon each operation of the erase button 17. The release button full-depression switch 45S is turned ON while the release button 13 is fully depressed, and the release button half-depression switch 46S is turned on while the release button 13 is depressed fully or halfway. The power switch 47S is turned ON/OFF in response to operation of a power switch of the camera 100.

The back cover switch 48S is a switch provided inside the body 11 to detect whether the back cover C is closed or opened. When the back cover C is closed, the back cover switch 48S is turned ON, and when the back cover C is opened, the back cover switch 48S is turned OFF. The system controller 30 judges whether the back cover C is closed or opened by detecting the status of the back cover switch 48S.

The system controller 30 is also connected with a power supply circuit 57 and the display device 22.

The power supply circuit 57 supplies electric power to the entire system of the camera 100.

The display device 22 displays information such as error messages, the number of the frames having been photographed, and the like.

The lens driver 50 drives, when an auto-focusing operation is performed, a focusing lens included in the photographing optical system 12 to move for focusing.

A superimposing circuit 51 forms supplemental information such as the date of photographing on the photographing film F.

A photometry circuit 53 measures a brightness of an object.

A strobe 58 is driven by a strobe driver 52 to illuminate an object when it is judged that auxiliary illumination is required based on the brightness of the object measured by the photometry circuit 53.

A distance measuring circuit 54 measures the distance from the camera to the object.

A frame number detecting circuit 55 detects the number of the photographed frames of the photographing film F (i.e., the number of images having been formed on the photographing film F), by counting the number of the perforations formed on either side of the photographing film F. Specifically, the frame number detecting circuit 55 includes a photo-interrupter having a light source and a photo sensor. The photo-interrupter is arranged such that the perforations of the film F runs between the light source and the photo sensor. As the photographing film F is fed or rewound, a pulse signal is output by the photo-interrupter (i.e., the frame number detecting circuit 55). By counting the number of the pulses, the number of the perforations passed through the photo-interrupter is detected, and accordingly, the number of frames can be detected.

A film winding device controller 56 controls the operation of winding/rewinding of the photographing film F.

The camera 100 has a plurality of modes of operations, which include:

(1) a playing mode where images corresponding to the frames of the image data stored in the memory are displayed on the LCD 23;

(2) a superimposing function setting mode where details on the superimposing function are set; and (3) an erasure mode selecting mode where one of erasure modes is selected.

By depressing the mode button 16, the operator can choose a mode out of the above three modes of operation.

First Embodiment

Figure 4:
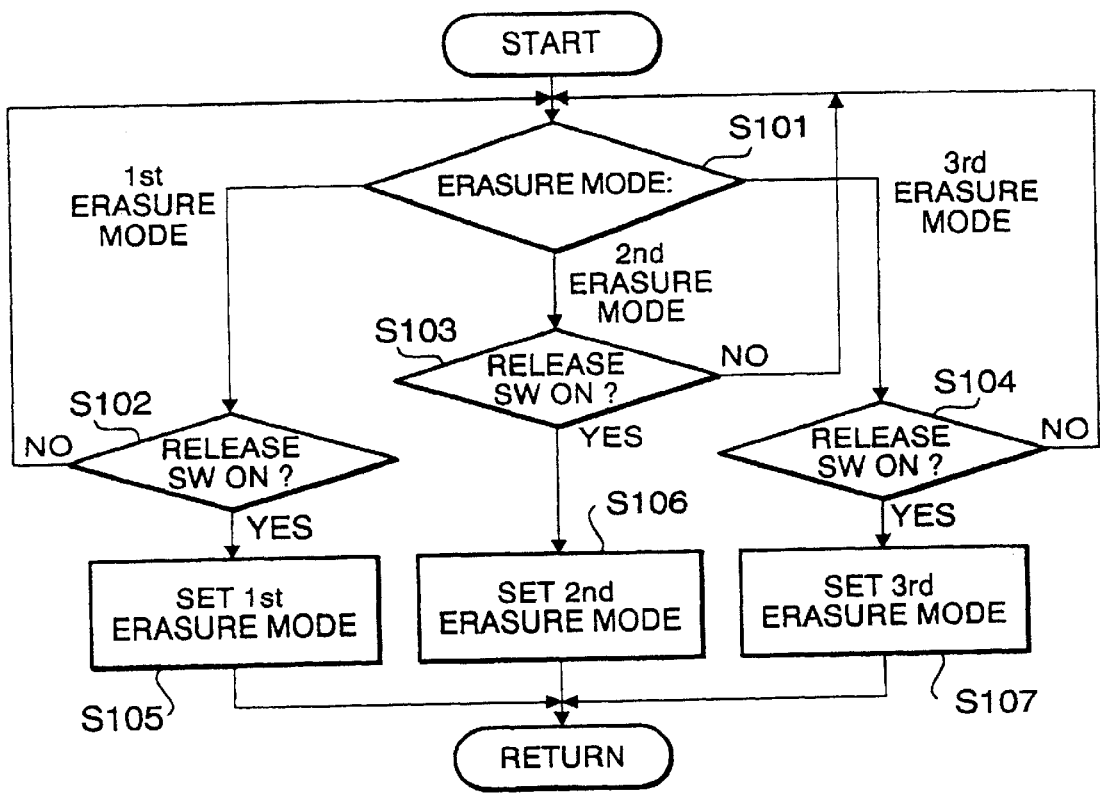
FIG. 4 is a flowchart showing a mode selection procedure.

FIG. 4 is a flowchart showing a mode selecting procedure in accordance with the first embodiment. The mode selecting procedure is initiated when the camera 100 operates in the erasure mode selecting mode.

In S101, the selection of the erasing mode, made by depressing the up-button 14 or the down-button 15, is checked.

In the first embodiment, the camera 100 has three erasure modes as follows:

(1) a first erasure mode where erasure of the image data in the memory is prohibited until the photographing film F is completely rewound;

(2) a second erasure mode where erasure of the image data, in the memory is prohibited until the photographing film F is completely rewound and the cover C is opened; and (3) a third erasure mode where erasure of the image data is enabled regardless whether the photographing film F has been completely rewound or the cover C is opened (i.e. the image data can be erased any time).

The selection from among the above three erasure modes is made by operating the up-button 14 or the down-button 15 when the camera 100 operates in the erasure mode selection mode.

The display device 22 indicates the selected erasure mode by displaying a blinking number "1", "2", or "3".

If it is judged, in S101, that the first erasure mode is selected, control goes to S102, where it is judged whether the release button 13 is fully depressed.

If the release button 13 is not fully depressed (S102: NO) control goes back to S101.

If the release button 13 is fully depressed (S102: YES), control goes to S105, where the first erasure mode is established (i.e., the first erasure mode is set).

If it is judged that the second erasure mode is selected in S101, control goes to S103, where it is judged whether the release button 13 is fully depressed.

If the release button 13 is not fully depressed (S103: NO), control goes back to S101.

It the release button 13 is fully depressed (S103: YES), control goes to S106, where the second erasure mode is established.

If it is judged that the third erasure mode is selected in S101, control goes to S104, where it is judged whether the release button 13 is fully depressed.

If the release button 13 is not fully depressed (S104: NO) control goes back to S101.

If the release button 13 is fully depressed (S104: YES), control goes to S107, where the third erasure mode is established. As described above, by operating the up-button 14 or the down-button 15, an erasure mode is selected from among the first, second and third erasure modes. After a desired one of the erasure modes is selected, and then the release button 13 is fully depressed, the selected mode is established, i.e., the camera 100 operates in the selected deletion mode.

Figure 5:
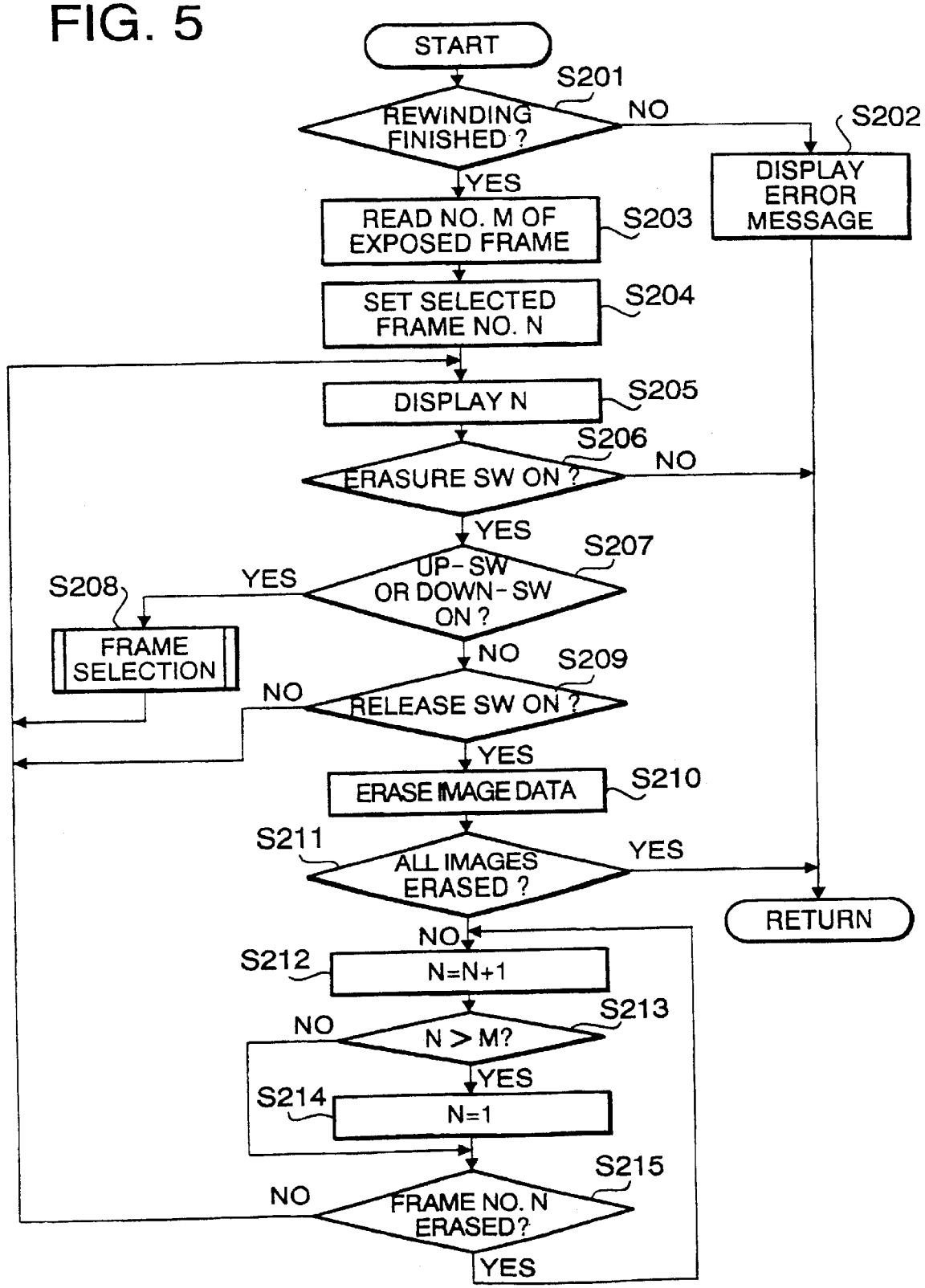
FIG. 5 is a flowchart showing an erasure procedure in the first erasure mode.

FIG. 5 is a flowchart showing a first erasure procedure which is initiated when the camera 100 operates in the first deletion mode, and when the erase button 17 is operated.

When the erase button 17 is operated, it is judged, in S201, whether the photographing film F has been rewound based on the information from the frame number detecting circuit 55 which counts the number of perforations on the photographing film F. Rewinding of the photographing film F starts after the last frame of the photographing film F is used or when a rewind button (not shown) is operated.

If it is judged that the rewinding of the photographing film F has not been completed (S201: NO), control goes to S202 and the display device 22 displays an error message. Then, the procedure shown in FIG. 5 is terminated.

If it is judged that the rewinding of the photographing film F has been completed (S201: YES), control goes to S203.

In S203, the number M of the frames of images formed on the photographing film F is read.

In S204, the smallest frame number of the image data stored in the flash memory 42 is detected, and a selected frame number N is set to the smallest frame number. It should be noted that the selected frame number N is defined as the frame number of the image data subject to an erasure operation. The frame numbers of the image data in the flash memory 42 correspond to the frame numbers of the images formed on the photographing film F. Therefore, when the procedure shown in FIG. 5 is executed first time, the smallest frame number of the image data is one (1), and the maximum frame number of the image data is M. If the first frame of the image data has not been erased, the smallest frame number is one (1), and the selected frame number N is set to one in S204. When the first frame of the image data has been erased but the second frame has note been erased, the smallest frame number N is two (2), and in such a case, the selected frame number N is set to two (2).

In S205, the first frame number N is displayed on the indicator 22, and the corresponding image is displayed on the LCD 23.

In S206, it is judged whether the erase switch 17S is turned ON. As described above, the erase switch 17S changes its status upon operation of the erase switch 17. If the erase switch 17S is ON, and the erase button 17 is operated, the erase switch 17S is turned OFF, and maintains its status until the erase button 17 is operated again. If the erase button 17 is operated again, the erase switch 17S is turned ON, and maintains the status until the erase button 17 is operated again.

If it is judged that the erase switch 17S is turned OFF (S206: NO), the procedure shown in FIG. 5 is terminated.

If it is judged that the delete button 17 is turned ON (S206: YES), control goes to S207, where it is judged whether the up-button 14 or the down-button 15 is depressed. When the operator intends to select another frame, the up-button 14 or the down-button 15 is depressed.

If it is judged that the up-button 14 or the down-button 15 is depressed (S207: YES), control goes to S208. In S208, a subroutine, "FRAME SELECTION" is called, where the selected frame number N is changed. The details of the subroutine called in S208 will be described later.

If it is judged that neither the up-button 14 nor the down-button 15 is depressed in S207, it is judged, in S209, whether the release button 13 is fully depressed.

If the release button 13 is not fully depressed (S209: NO), control goes back to S205.

If the release button 13 is fully depressed (S209: YES), control goes to S210, where it is judged whether a frame of the image data corresponding to the selected frame number N (i.e., an N-th frame of the image data) is erased. Then, control goes to S211.

In S211, it is judged whether all the frames of the image data stored in the flash memory 42 have been erased.

If it is judged that all the frames of the image data in the flash memory 42 have been erased (S211: YES), the procedure shown in. FIG. 5 is terminated.

If all the frames of the image data in the flash memory 42 have not been erased (S211: NO), control goes to S212, where the selected frame number N is incremented by one (1).

In S213, it is judged whether the selected frame number N is greater than the number of the frames M of the images formed on the photographing film F.

If the selected frame number N is greater than the number of the photographed frames M, control goes to S214, where the system controller 30 sets the selected frame number N to one (1).

If it is judged that the selected frame number N is not greater than the number of the photographed frames M, control skips S214 and goes to S215.

In S215, it is judged whether an N-th frame of the image data (i.e., a frame of the image data corresponding to the selected frame number N) has been already erased.

If the N-th frame of the image data has already been erased, control goes back to S212 where the selected frame number N is incremented by one (1) to select a subsequent frame. Until the selected frame number N is set to the number of the smallest existing (i.e., undeleted) frame of the image data, a loop of S212 through S215 is repeated, and the selected frame number N is changed.

If it is judged that the image data of the selected frame number N has not been erased (S215: NO), the system controller 30 goes back to S205. when the procedure shown in FIG. 5 is executed, firstly the first undeleted frame is selected automatically. By operating the up-button 14 or down-button 15, another frame can be selected. By fully depressing the release button 13, the selected frame (i.e., the N-th frame) of the image data is erased. Thereafter, a next undeleted frame of the image data is automatically selected.

Figure 6:
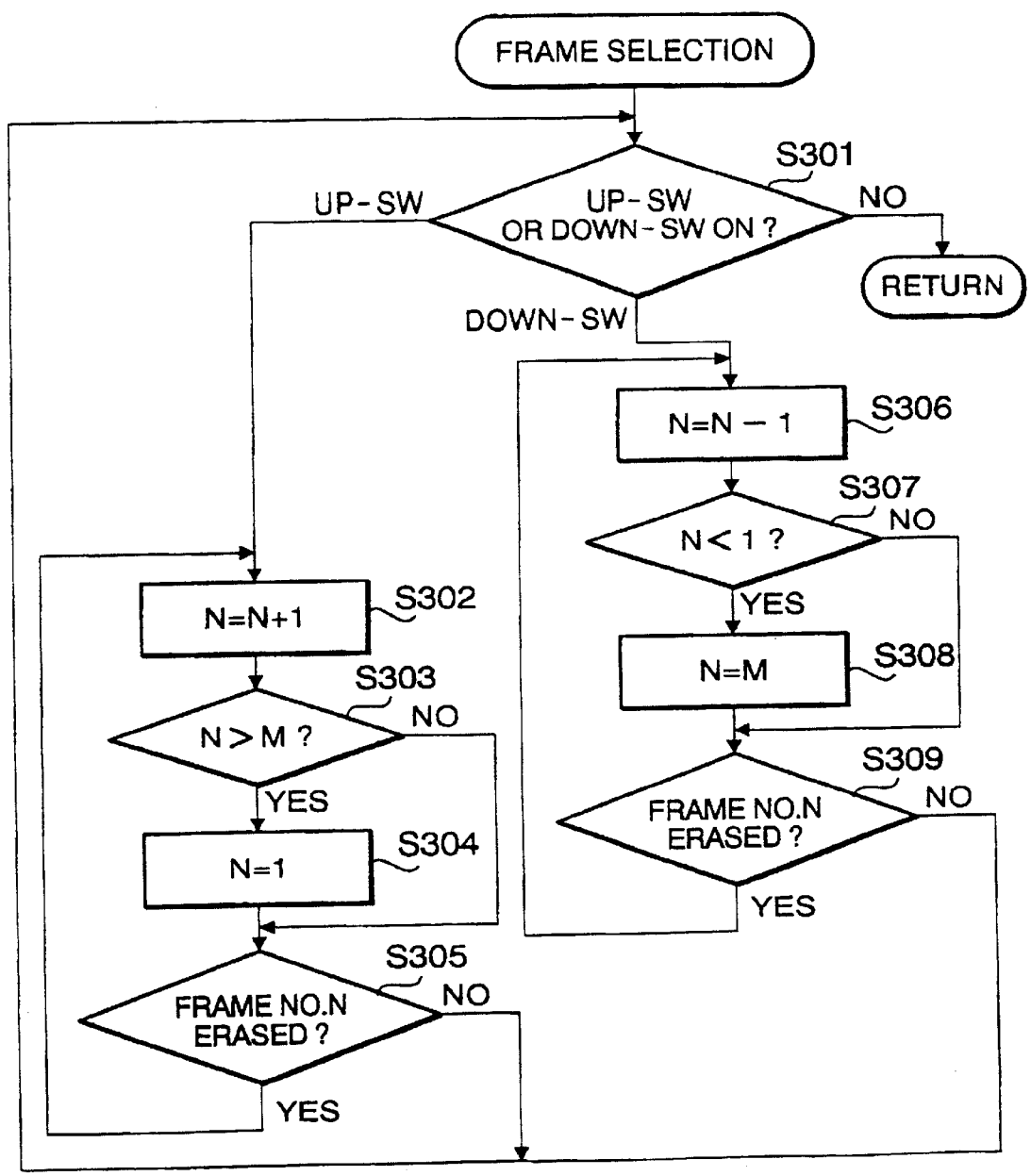
FIG. 6 is a flowchart showing a frame selection subroutine called in a procedure in FIG. 5.

FIG. 6 is a flowchart showing the subroutine "FRAME SELECTION" called in S208 of the procedure shown in FIG. 5.

In S301, it is judged whether the up-button 14 or the down-button 15 is depressed.

If the up-button 14 is depressed, control goes to S302.

If the down-button 15 is depressed, control goes to S306.

If neither up-button 14 nor the down-button 15 is fully depressed, the subroutine shown in FIG. 6 is terminated, and control returns to a portion where the subroutine was called.

In S302, the selected frame number N is incremented by one (1) in S303, it is judged whether the selected frame number N is greater than the number of the photographed frames M.

If the selected frame number N is greater than the number of the photographed frames M (S303: YES), the selected frame number N is set to one (1) in S304.

If the selected frame number N is not greater than the number of the photographed frames M (S303: NO), control skips S304 and goes to S305.

In S305, it is judged that whether an N-th frame (i.e., a frame identified by the selected frame number N) of the image data has been erased.

If the N-th frame of the image data has already been erased (S305: YES), control goes back to S302 and the selected frame number N is incremented. Until an undeleted frame of the image data is found, a loop of S302 through S305 is repeated. When an undeleted frame of the image data is found (S305: NO), then control goes back to S301. Thus, when the up-button 14 is depressed and then released immediately, the loop of S302 to S305 is repeated to find an undeleted frame, the selected frame number N is set to the found frame number, and control goes to S301.

If it is judged, in S301, that the down-button 15 is depressed, control goes to S306.

In S306, the selected frame number N is decremented by one (1). In S307, it is judged whether the selected frame number N is less than one, which is the first number of the photographed frames M.

If it is judged that the selected frame number N is less than one (S307: YES), the selected frame number N is set to the number M of the photographed frames (i.e., the maximum frame number) in S308.

If it is judged that the selected frame number N is not less than one (S307: NO), control skips S308 and goes to S309.

In S309, it is judged that whether the N-th frame (i.e., a frame identified by the selected frame number N) of the image data has been erased.

If the N-th frame of the image data has already been erased (S309: YES), control goes back to S306 and the selected frame number N is changed. Until an undeleted frame of the image data is found, a loop of S306 through S309 is repeated. When an undeleted frame of the image data is found (S309: NO), then control goes back to S301.

If neither up-button 14 nor the down-button 15 is depressed, selection of another frame has been completed and the subroutine shown in FIG. 6 is terminated.

Figure 7:
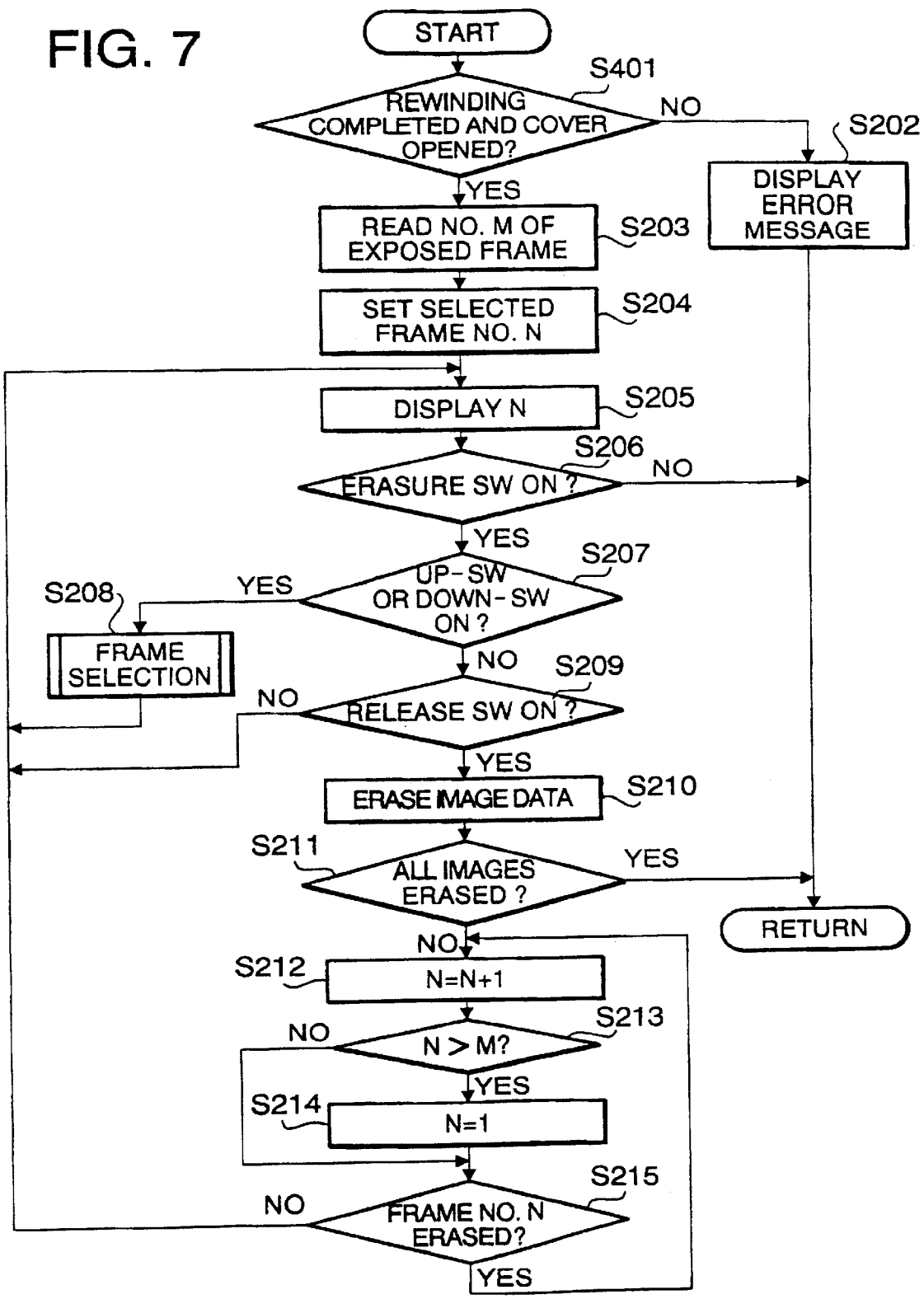
FIG. 7 is a flowchart showing an erasure procedure in the. second erasing mode.

FIG. 7 is a flowchart showing a second erasure procedure which is performed in the second erasure mode.

The system controller 30 performs the second erasure procedure shown in FIG. 7 when the second erasure mode is set and the erasure button 17 is operated to turn ON the erasure switch 17S.

In S401, it is judged whether the photographing film F has been rewound and further the cover C is opened.

Only when the photographing film F has been rewound and the cover C is opened, control goes to S203 to perform data deleting operation. Otherwise, the display device 22 displays an error message, and the procedure shown in FIG. 7 is terminated.

The steps S203 through S215 are the same as the steps shown in FIG. 5 having the same step numbers, and accordingly description thereof will not be repeated.

Figure 8:
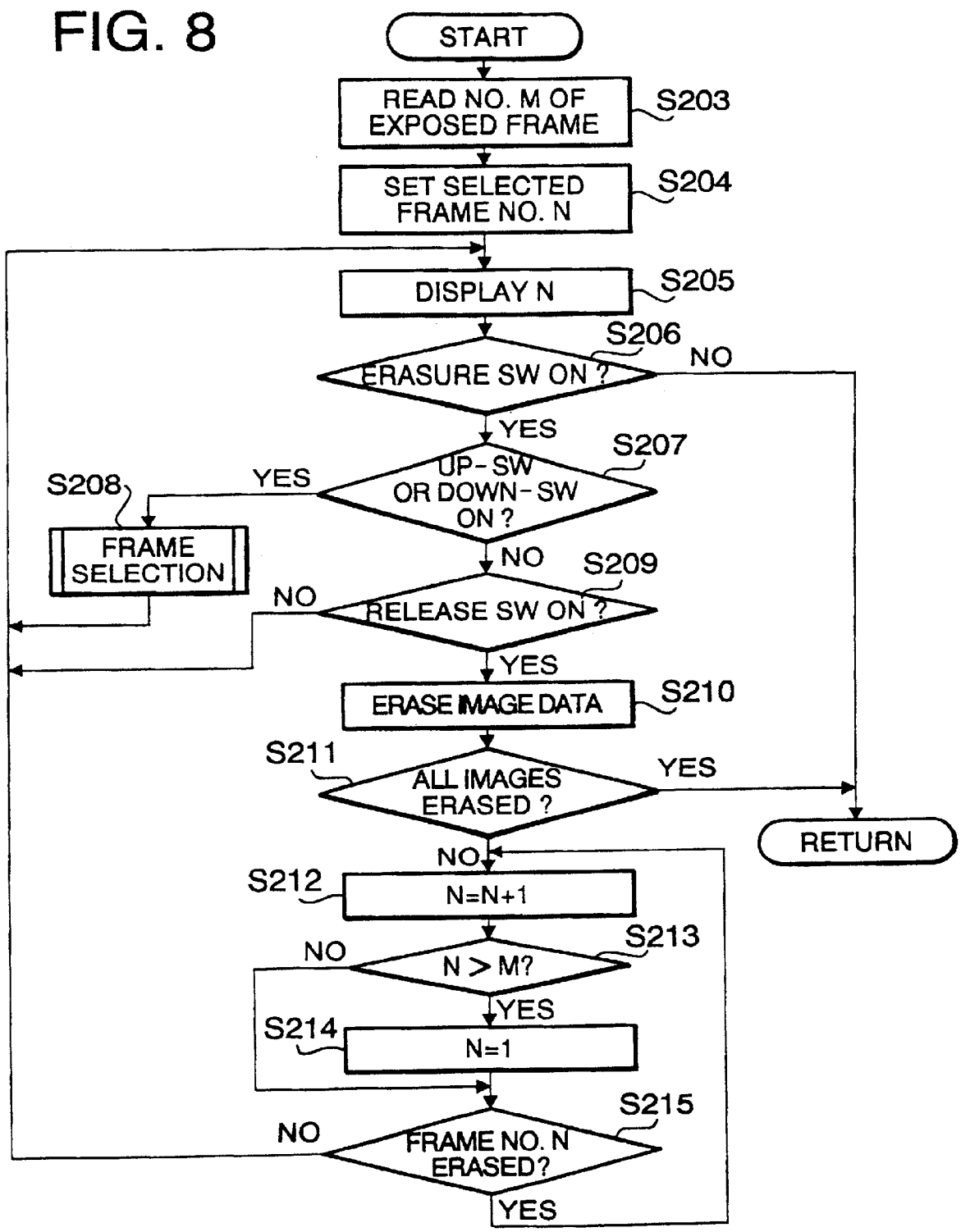
FIG. 8 is a flowchart showing an erasure procedure in the third erasing mode.

FIG. 8 is a flow chart showing a third erasure procedure performed in the third erasure mode.

The third erasure procedure shown in FIG. 8 is initiated when the erasure button 17 is operated to turn ON the erasure switch 17S when the third erasure mode is set.

In the third erasing mode, the image data in the flash memory 42 can be erased in response to the operation of the release button 13, without judging whether the photographing film F is rewound and/or whether the cover C is opened.

The steps S203 through S215 are the same as the steps shown in FIG. 5 or FIG. 7 having the same reference numbers, and description thereof will be omitted.

Figure 3:
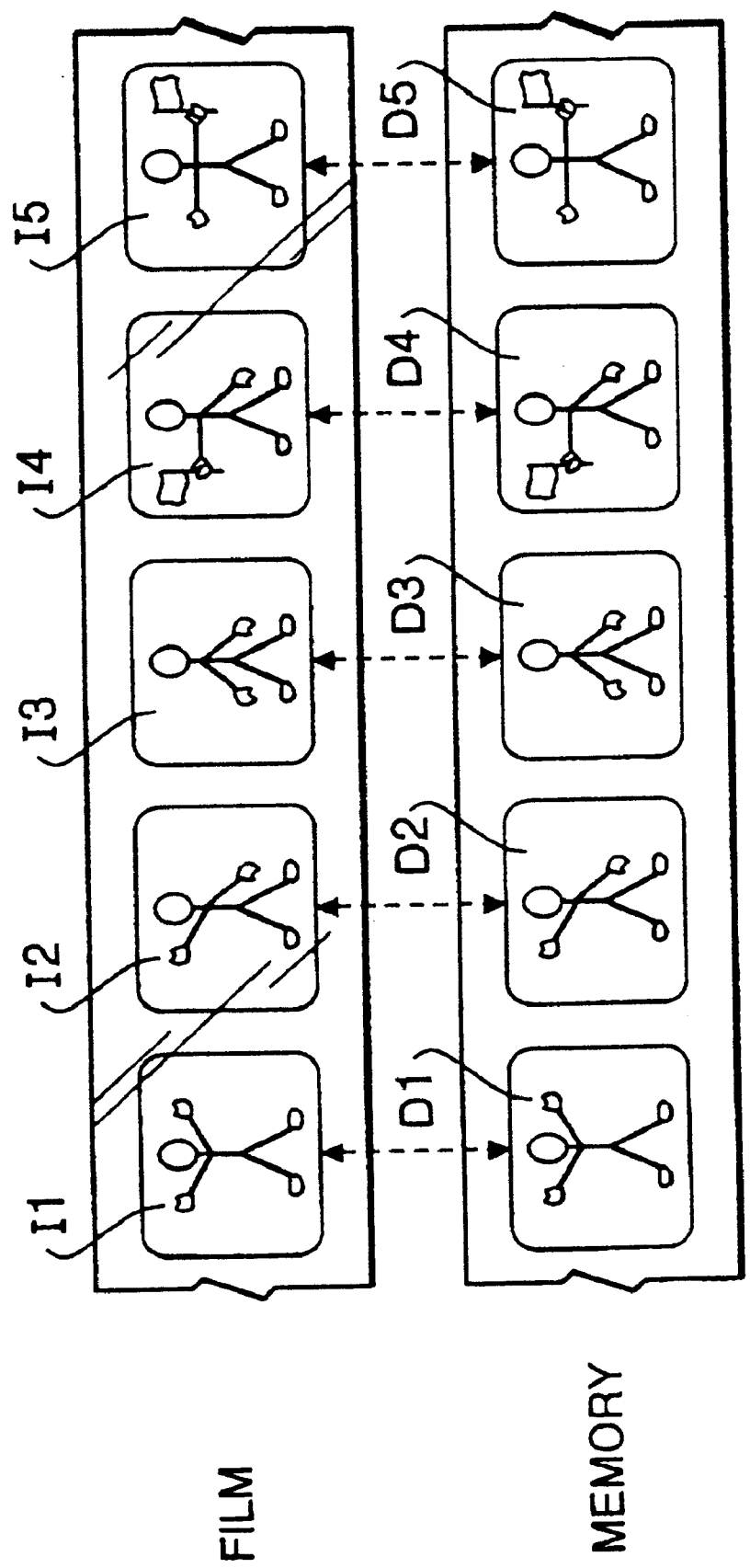
FIG. 3 shows a relationship between image data in the flash memory and images formed on a photographing film in accordance with the embodiment of the present invention.

FIG. 3 shows a relationship between the image data in the flash memory 42 and images on the photographing film F when the first or second deletion mode is set.

In the first embodiment of the invention, erasure of the image data is prohibited until the photographing film has been rewound. In the second deletion mode, it is further required that the back cover is opened in order to erase the image data.

Thus, as shown in FIG. 3, the number and order of the images on the photographing film F completely correspond to the frames of the image data stored in the flash memory 42 while a photographing film is being used.

It should be noted that in the first embodiment, the erasure control system includes a plurality of erasure modes and one of which should be selected. However, the invention is not limited to such configuration, but only one of first or second erasure mode may be employed.

Further, in the first embodiment, whether the operator does not intend to form images on a currently loaded film is determined when the film has been rewound or when the film has rewound and the back cover is opened. The determination may be made based on another status. For example, the determination may be made when the cover is opened without detecting the rewinding status of the film, when a new film is loaded, when no film is loaded in the camera, or the like.

Second Embodiment

The second embodiment will be described hereinafter.

In the second embodiment, all the frames of the image data stored in the memory are erased when it is judged that the image formation on a film has been completed. Procedures according to the second embodiment can also be performed in the camera 100 shown in FIGS. 1 and 2. Further, the procedure according to the second embodiment can be employed together with the procedures according to the first embodiment.

Similarly to the first embodiment, the camera 100 has a plurality of modes of operation, which include:

(1) a playing mode where images corresponding to the image data stored in the memory are displayed on the LCD 23;

(2) a superimposing function setting mode where details on the superimposing function are set; and (3) an erasure function setting/releasing mode where an erasure mode according to the second embodiment is set/released.

By depressing the mode button 16, the operator can choose a mode from among the above modes of operation.

Figure 9:
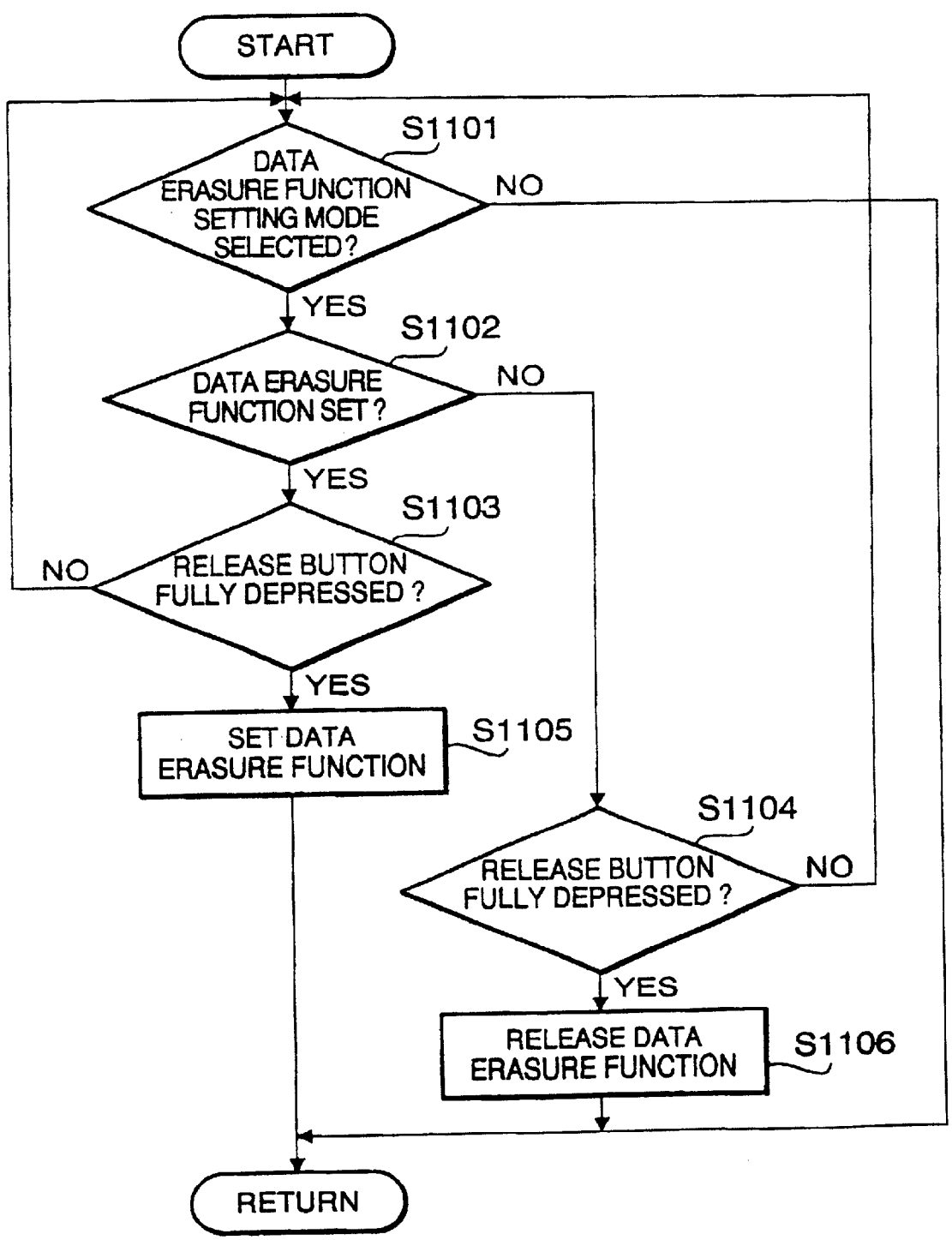
FIG. 9 is a flowchart showing a setting/resetting procedure of a data erasure function.

FIG. 9 is a flowchart showing an erasure function setting/releasing procedure in accordance with the second embodiment.

When the mode button 16 is operated, the procedure shown in FIG. 9 starts.

In S1101, it is judged whether the erasure function setting/releasing mode is selected by operating the mode button 16.

In the data erasure function setting mode, whether a data erasure function is set or not is established. When the data erasing function is set, the system controller 30 erases all the frames of the image data in the flash memory 42 when it is determined that the image forming operation on a film has been completed. Specifically, according to the second embodiment, when a new film is loaded on the camera 100, it is judged that the image forming (i.e., photographing) operation on a previously loaded film has been completed.

If it is judged that the data erasure function setting mode is selected (S1101: YES), control goes to S1102, otherwise the procedure shown in FIG. 9 is terminated.

In S1102, whether the erasure function is to be set or released is judged.

By depressing the up-button 14 or the down-button 15, whether the data erasure function is to be set or released can be selected. Upon operation of the up-button 14 or the down-button 15, a character string "set" or "release" is displayed on the display device 22 to indicate the currently selected mode. Then by depressing the release button 13, the selection is established.

If the data erasure function is selected (S1102: YES), control goes to S1103.

In S1103, it is judged whether the release button 13 is fully depressed. If the release button 13 is fully depressed (S1103: YES), the data erasure function is set (S1105), and the procedure shown in FIG. 9 is terminated.

If it is judged that the data erasure function is to be released (S1102: NO), control goes to S1104, where it is judged whether the release button 13 is fully depressed. If the release button 13 is fully depressed (S1104: YES), control goes to S1106, where the data erasure function is released (i.e., the released status is established). Then the procedure shown in FIG. 9 is terminated.

Figure 10:
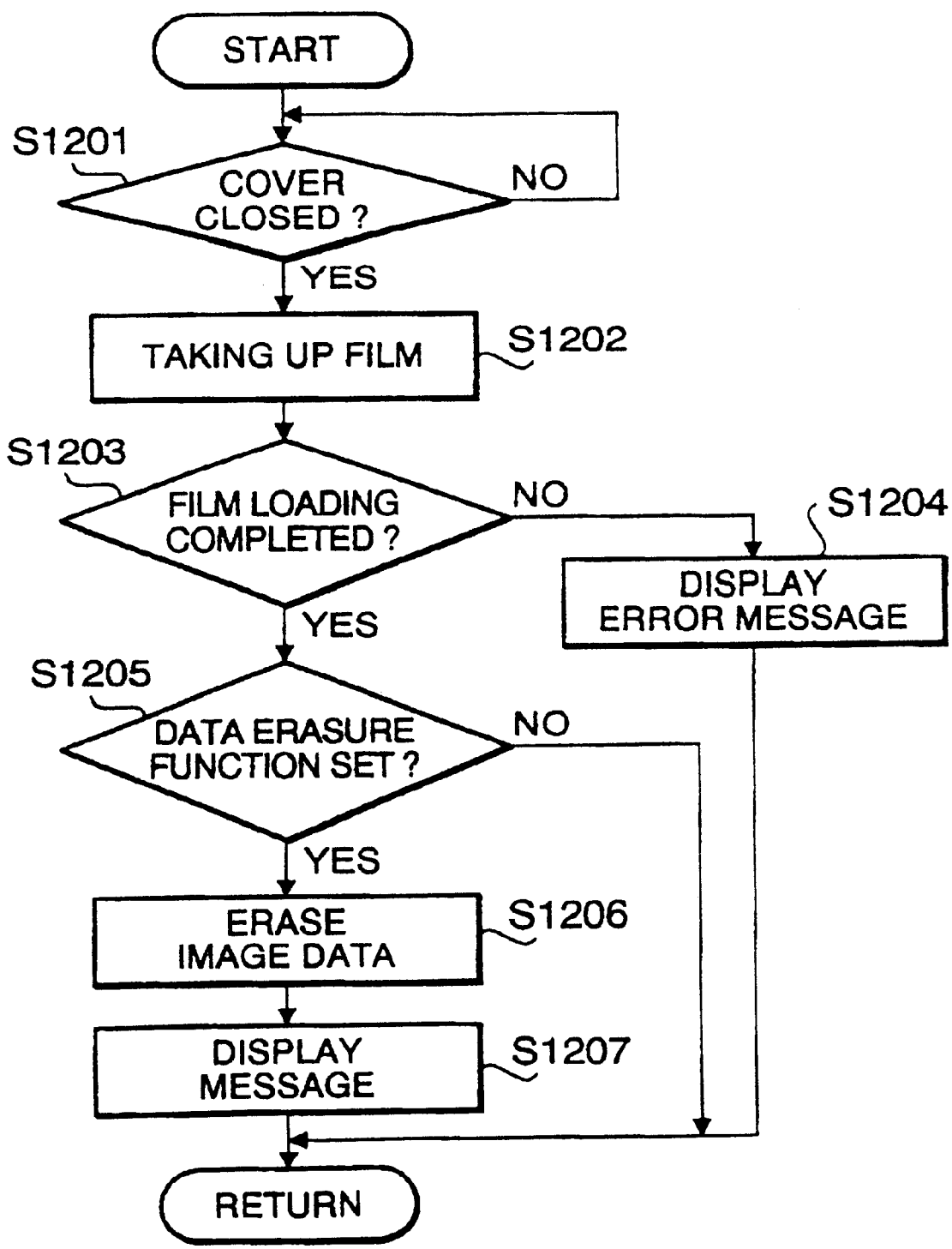
FIG. 10 is a flowchart showing a procedure when a data erasure function is set.
Figure 11:
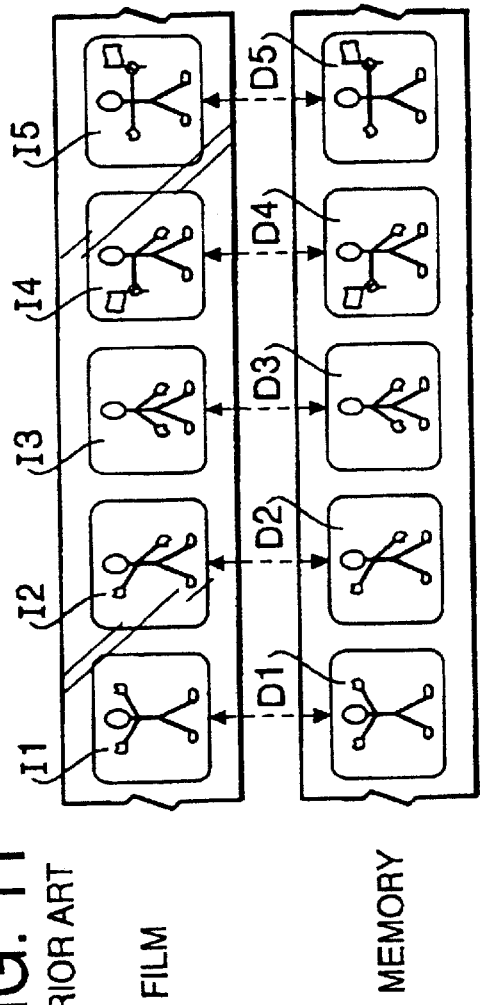
FIGS. 11 and 12 show a relationship between images on the film and frames of image data in the memory in the conventional system, when a frame of the image data is erased.
Figure 12:
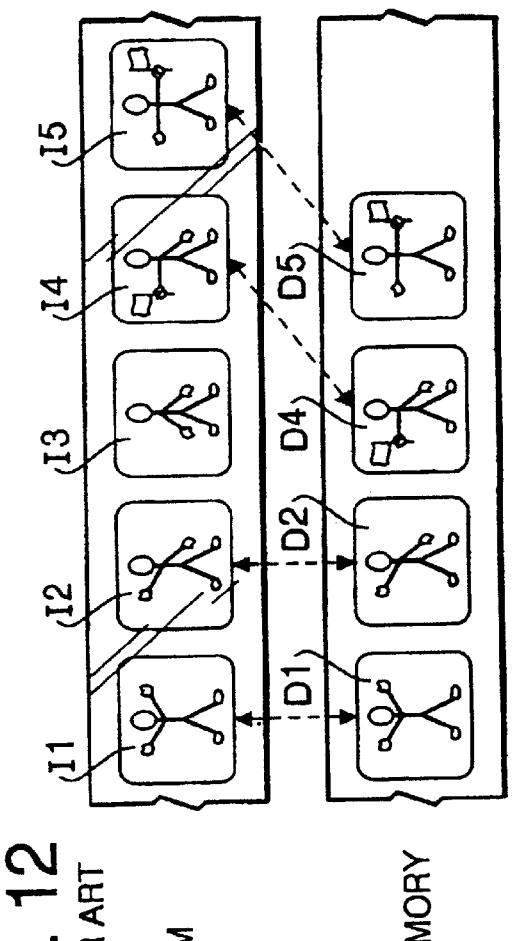
Figure 13:
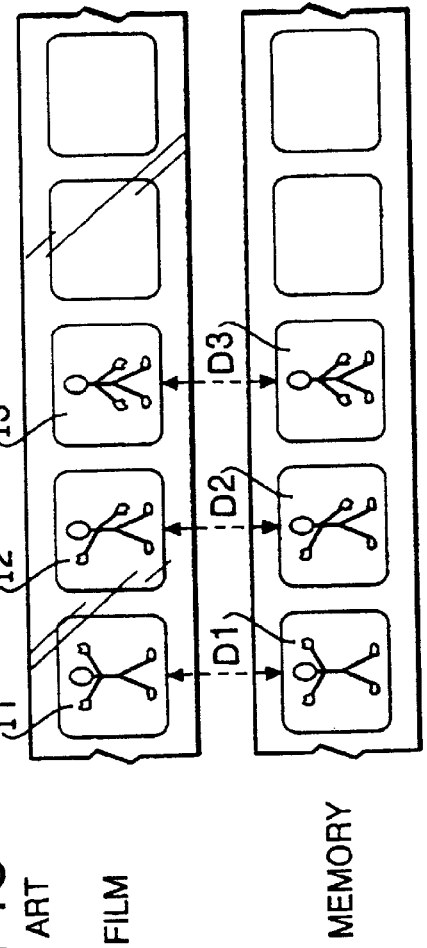
FIGS. 13 and 14 show a relationship between images on the film and frames of the image data in the memory in the conventional system.
Figure 14:
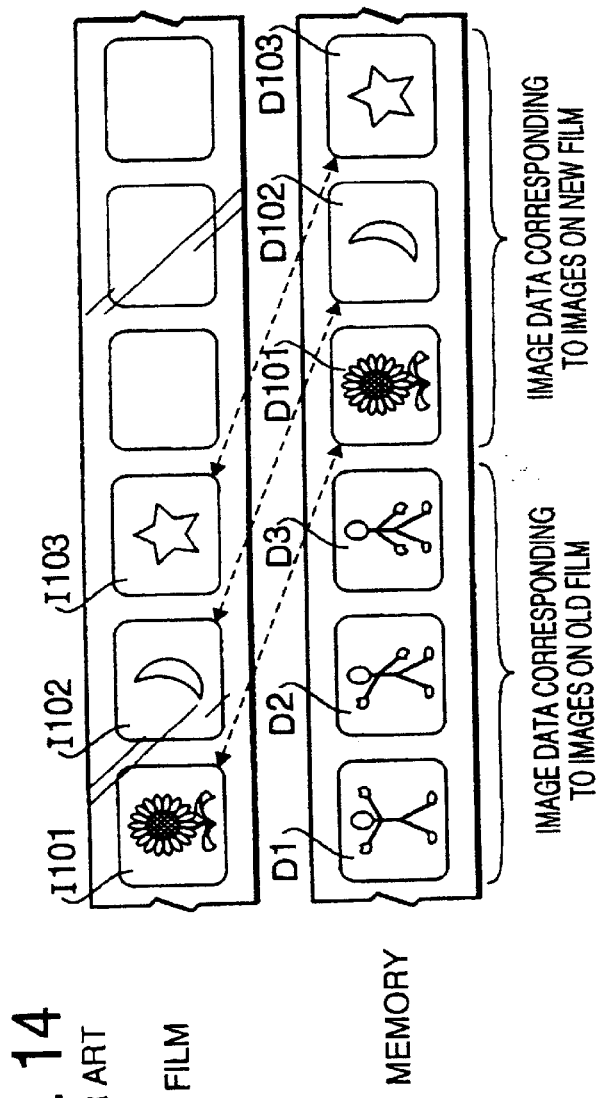

FIG. 10 is a flowchart showing a procedure when the data erasure function is set, and the back cover C is opened.

In S1201, it is judged whether the back cover C, which was opened, has been closed based on the signal transmitted from the back cover switch 48S.

When photographing films are exchanged, the operator of the camera 100 opens the back cover C, removes the previously loaded film (which was rewound), puts a cartridge of a new film in the film cartridge holder provided in the body 11, and then closes the back cover C. Accordingly, by detecting that the status of the back cover C has been changed from an opened status to a closed status, exchange of the films can be detected. It should be noted that even if the films are not exchanged, it is confirmed that at least photographing operation with respect a previously loaded film has been completed if the status of the back cover switch 48S is changed.

The image data stored in the flash memory 42 could be erased at this stage. However, if a new film has not yet been loaded, it is not necessary to erase the image data. Rather, it may be preferable to remain the image data until a new film is loaded since the operator may wish to review the previously captured frames before a new film is loaded. Accordingly, in the second embodiment, the image data is not erased even if closure of the back cover C is detected.

In S1202, a film loading operation is performed. If a new film is inserted, the leading end of the film is taken up, and the film is loaded so that photographing operation can be performed.

In S1203, it is judged whether loading of anew photographing film F is successfully completed based on the information from the frame number detecting circuit 55. Specifically, when the film cartridge is not loaded in the cartridge holder or when the photographing film F is not properly loaded, the frame number detecting circuit 55 does not detect a predetermined number of perforations. Thus, in such a case, it is judged that loading of the photographing film F has not been completed. If the film has not been loaded (S1203: NO), an error message is displayed on the display device 22, and the procedure shown in FIG. 10 is terminated. It should be noted that failure of film loading is detected when a new film is inserted in the cartridge holder and the loading is failed, or when a new film is not inserted. In either case, the error message is displayed.

If it is judged that the back cover C is closed (S1201: YES) and further loading of the film is completed (S1203: YES), then it is judged whether the data erasure function is set or released (S1205).

If the data erasure function is released, procedure shown in FIG. 10 is terminated (i.e., the image data is not deleted).

If the data erasure function is set, control goes to S1206.

In S1206, the system controller 30 erases entire image data stored in the flash memory 42. Then, in S1207, the display device 22 displays a message indicating that the entire image data stored in the flash memory 42 has been erased.

According to the second embodiment, since all the frames of the image data in the flash memory are erased upon loading of a new photographing film, as shown in FIG. 3, the number and order of the images formed on the newly loaded photographing film F correspond to the number and order of the frames of the image data stored in the flash memory 42.

The present disclosure relates to the subject matters contained in Japanese Patent Applications No. HEI 10-136507, filed on May 19, 1998, and No. HEI 10-160314, filed on June 9, 1998, which are expressly incorporated herein by reference in their entireties.

What is claimed is:

1. A data erasure control system for a camera capable of forming images on a photographing film, and of capturing and storing image data including a plurality of frames in a memory, said plurality of frames corresponding to the photographed images on said photographing film, said data erasure control system comprising:
   a judging system that judges whether a photographing operation with respect to a photographing film has been completed; and
   a data erasure prohibiting system that prohibits the image data from being erased until said judging system judges that a photographing operation with respect to a photographing film has been completed, even when the erasure of the image data is instructed.

2. The data erasure control system according to claim 1, wherein said judging system determines that the photographing operation has been completed when the film has been completely rewound.

3. The data erasure control system according to claim 2, wherein said judging system comprises a perforation counting system that counts the number of perforations formed on said photographing film and passed through said perforation counting system, and wherein said judging system determines whether said film has been rewound in accordance with the number of perforations counted by said perforation counting system.

4. The data erasure control system according to claim 1, wherein said judging system determines that the photographing operation has been completed when the film has been completely rewound and a back cover of said camera is opened.

5. The data erasure control system according to claim 4, wherein said judging system comprises a switch that is turned ON or OFF when said back cover is closed or opened.

6. The data erasure control system according to claim 1, wherein said data erasure prohibiting system allows erasure of said image data on frame basis when said judging system judges that the photographing operation has been completed.

7. The data erasure control system according to claim 6, further comprising a frame selecting system for selecting desired one of said plurality of frames of the image data, the selected frame of the image data being subjected to be erased.

8. The data erasure control system according to claim 7, further comprising an operable member, said selected frame of the image data being erased upon operation of said operable member.

9. The data erasure control system according to claim 8, wherein said judging system determines that the photographing operation has been completed when the film has been completely rewound.

10. The data erasure control system according to claim 8, wherein said judging system determines that the photographing operation has been completed when the film has been completely rewound and a back cover of said camera is opened.

11. The data erasure control system according to claim 1, wherein said data erasure prohibiting system erase all the frames of said image data when said judging system judges that the photographing operation has been completed.

12. The data erasure control system according to claim 11, wherein said judging system determines that the photographing operation has been completed when films are exchanged.

13. The data erasure control system according to claim 12, wherein said judging system determines that the photographing operation has been completed when a back cover of said camera is once opened and then closed.

14. The data erasure control system according to claim 12, wherein said judging system determines that the photographing operation has been completed when a new film is loaded in said camera.

15. The data erasure control system according to claim 14, wherein said judging system includes a film loading detecting system that detects whether the film has been loaded by detecting whether a predetermined amount of film has been taken up.

16. The data erasure control system according to claim 15, wherein said judging system comprises a perforation counting system that counts the number of perforations formed on said photographing film and passed through said perforation counting system, and wherein said judging system determines whether said film has been loaded in accordance with the number of perforations counted by said perforation counting system.

17. The data erasure control system according to claim 1, wherein the judging system judges whether a photographing operation with respect to a photographing film has been completed when erasure of the image data is instructed.

* * * * *